(No Model.) 10 Sheets—Sheet 1.

G. H. SPAULDING.
CORN HARVESTER.

No. 439,203. Patented Oct. 28, 1890.

Witnesses:
Jean Elliott.
Celeste P. Chapman.

Inventor:
Geo H. Spaulding
By Burton & Burton
Attorneys.

THE NORRIS PETERS CO., PHOTO-LITHO., WASHINGTON, D. C.

(No Model.)
10 Sheets—Sheet 5.

G. H. SPAULDING.
CORN HARVESTER.

No. 439,203. Patented Oct. 28, 1890.

Witnesses:
Jean Elliott
Celeste P. Chapman

Inventor
Geo. H. Spaulding
By Burton & W Burton
Attorneys

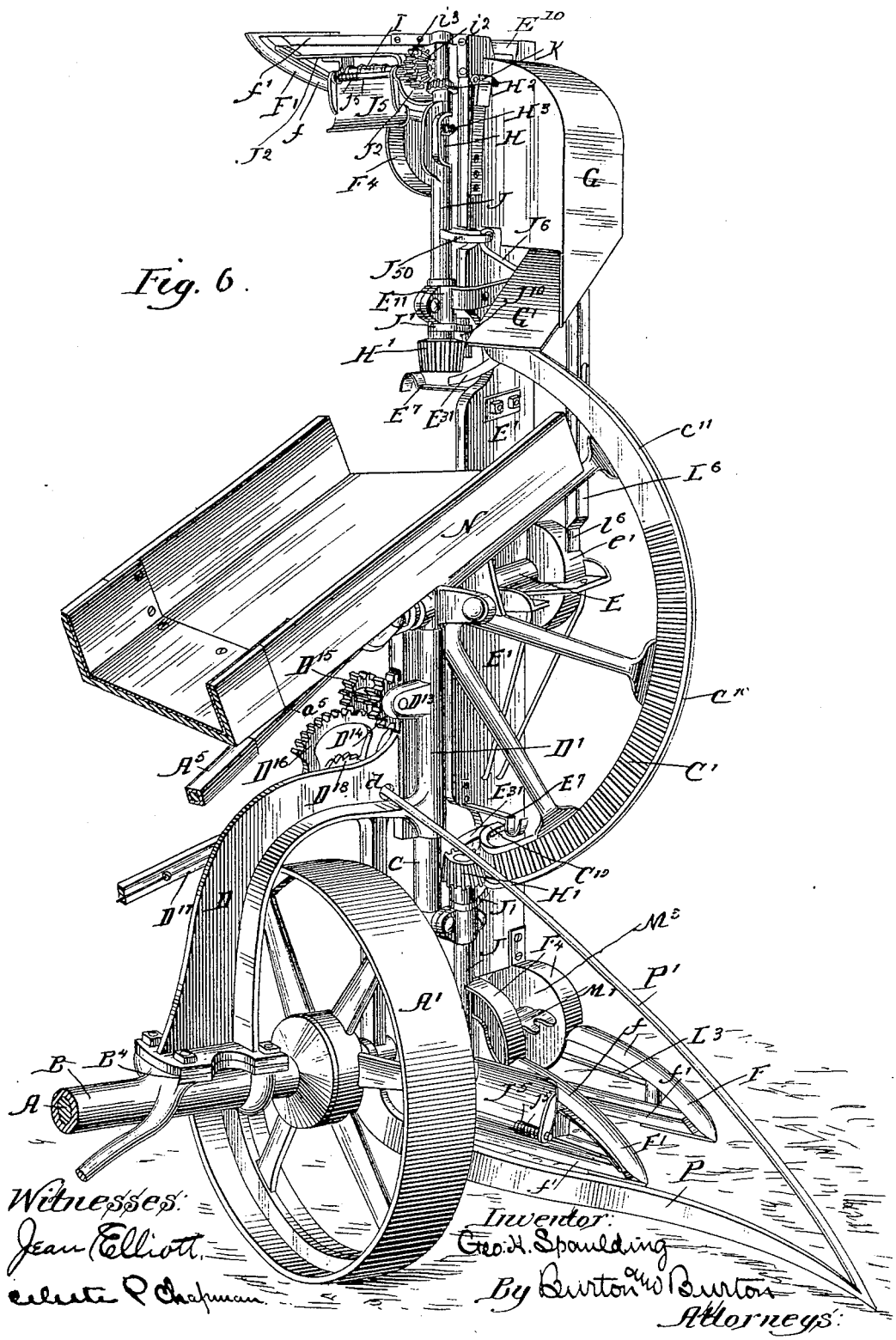

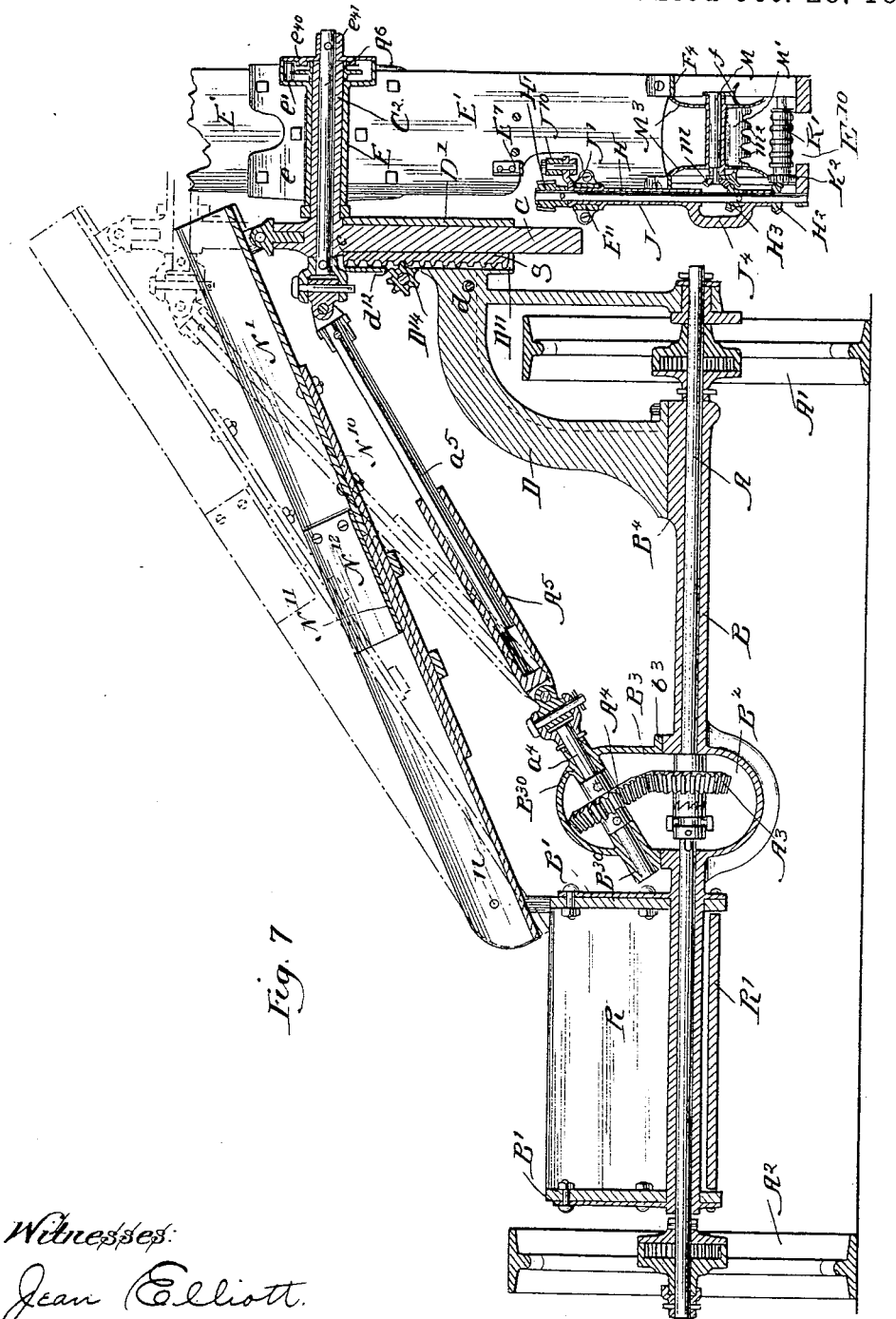

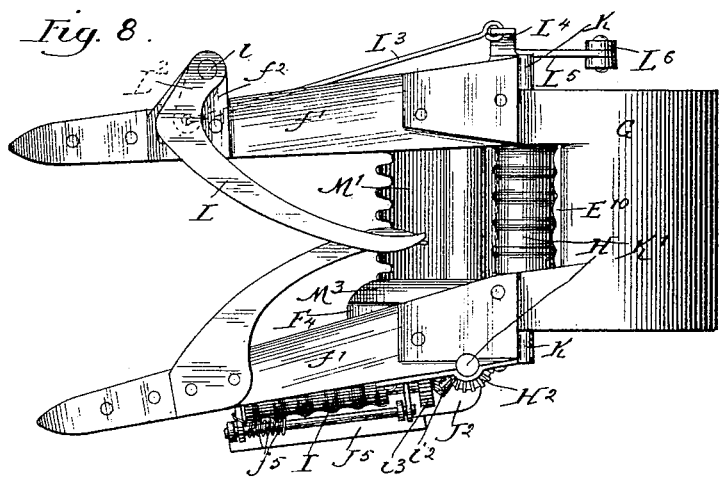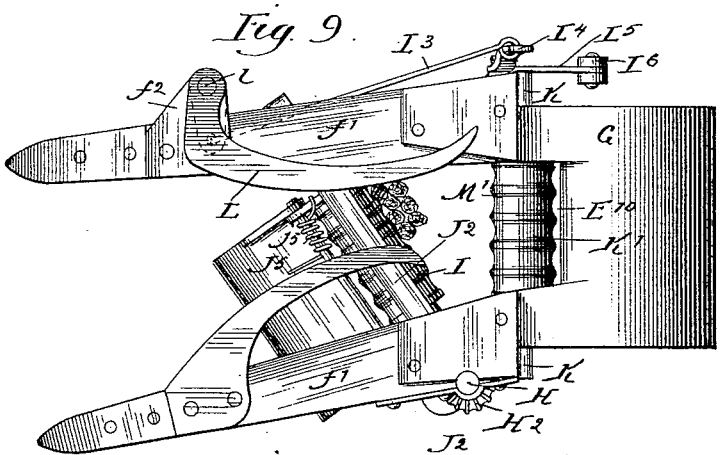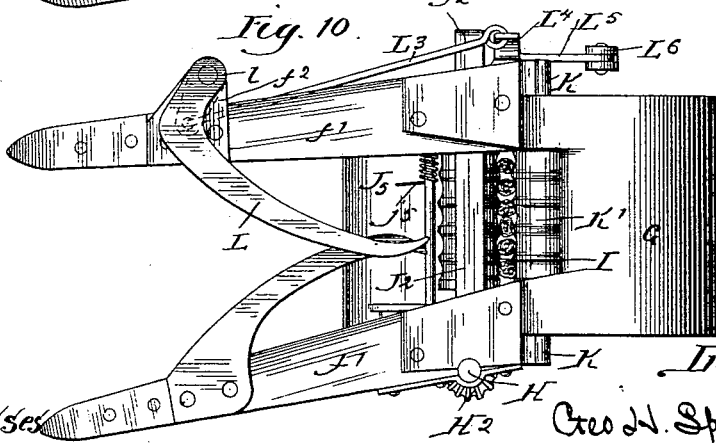

(No Model.)　　　　　　　　　　　　　　　　　　　10 Sheets—Sheet 9.
G. H. SPAULDING.
CORN HARVESTER.
No. 439,203.　　　　　　　　　　Patented Oct. 28, 1890.
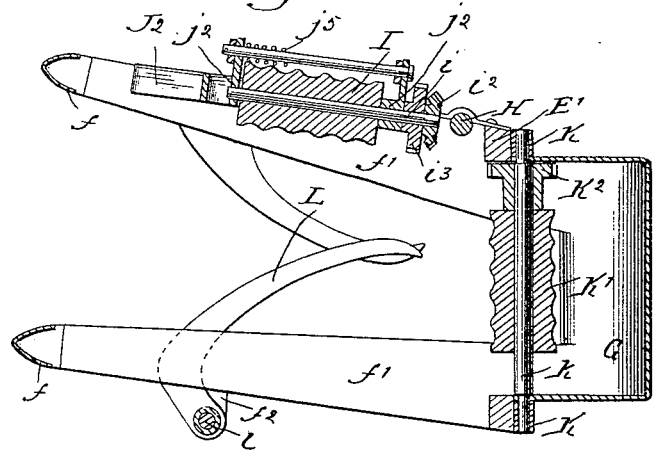
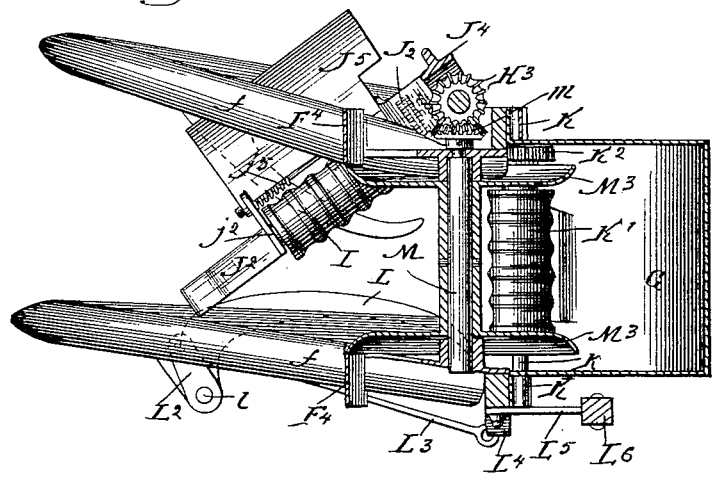
Witnesses:
Jean Elliott
Celeste P. Chapman
Inventor:
Geo. H. Spaulding
By Burton & Burton
Attorney.

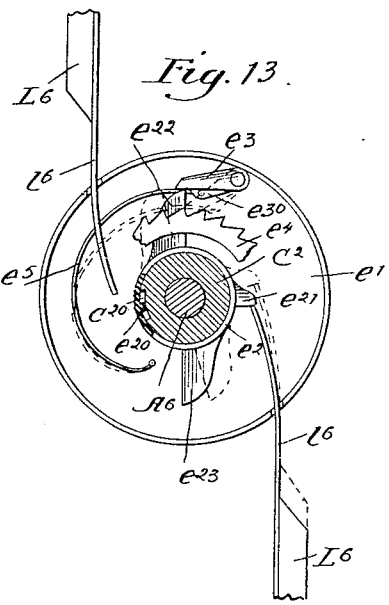
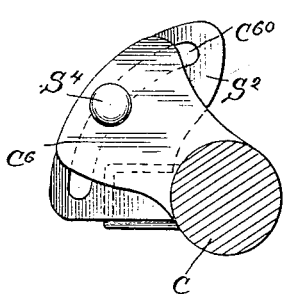
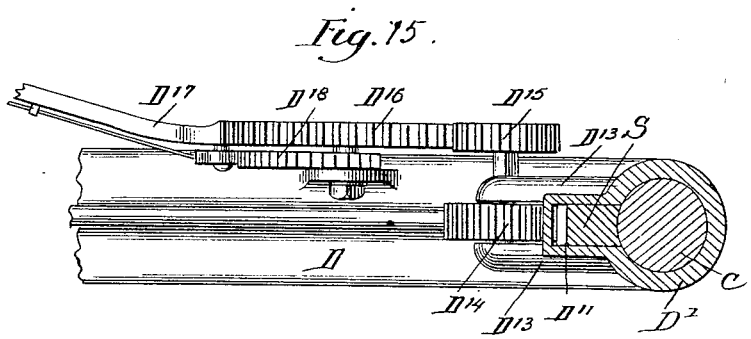

UNITED STATES PATENT OFFICE.

GEORGE H. SPAULDING, OF CHICAGO, ILLINOIS, ASSIGNOR OF ONE-HALF TO WILLIAM J. LUKENS, OF SAME PLACE.

CORN-HARVESTER.

SPECIFICATION forming part of Letters Patent No. 439,203, dated October 28, 1890.

Application filed July 22, 1889. Serial No. 318,242. (No model.)

*To all whom it may concern:*

Be it known that I, GEORGE H. SPAULDING, a citizen of the United States, residing at Chicago, county of Cook, and State of Illinois, have invented certain new and useful Improvements in Corn-Harvesters, which are fully set forth in the following specification, reference being had to the accompanying drawings, forming a part thereof.

Figure 1:
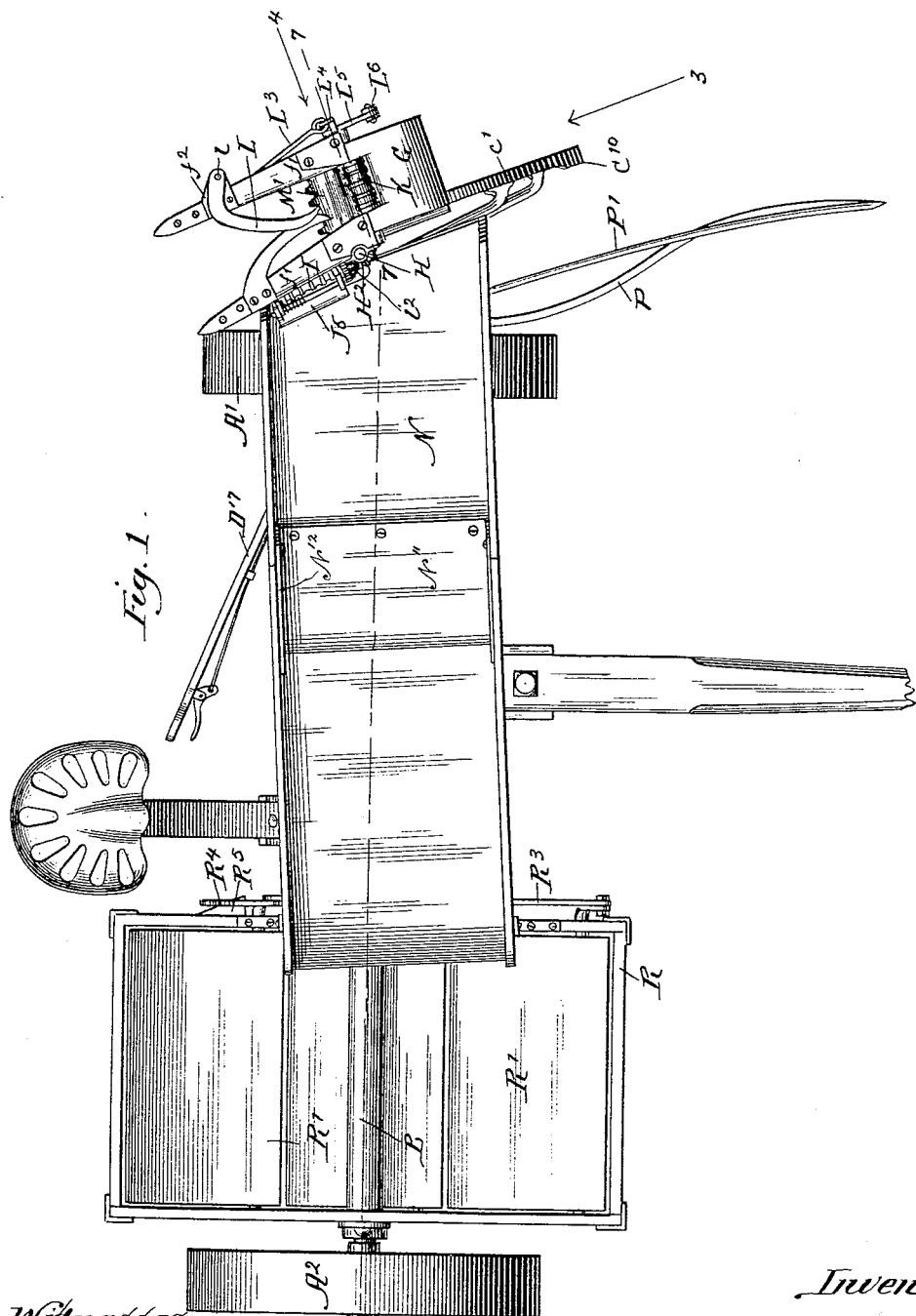
Figure 2:
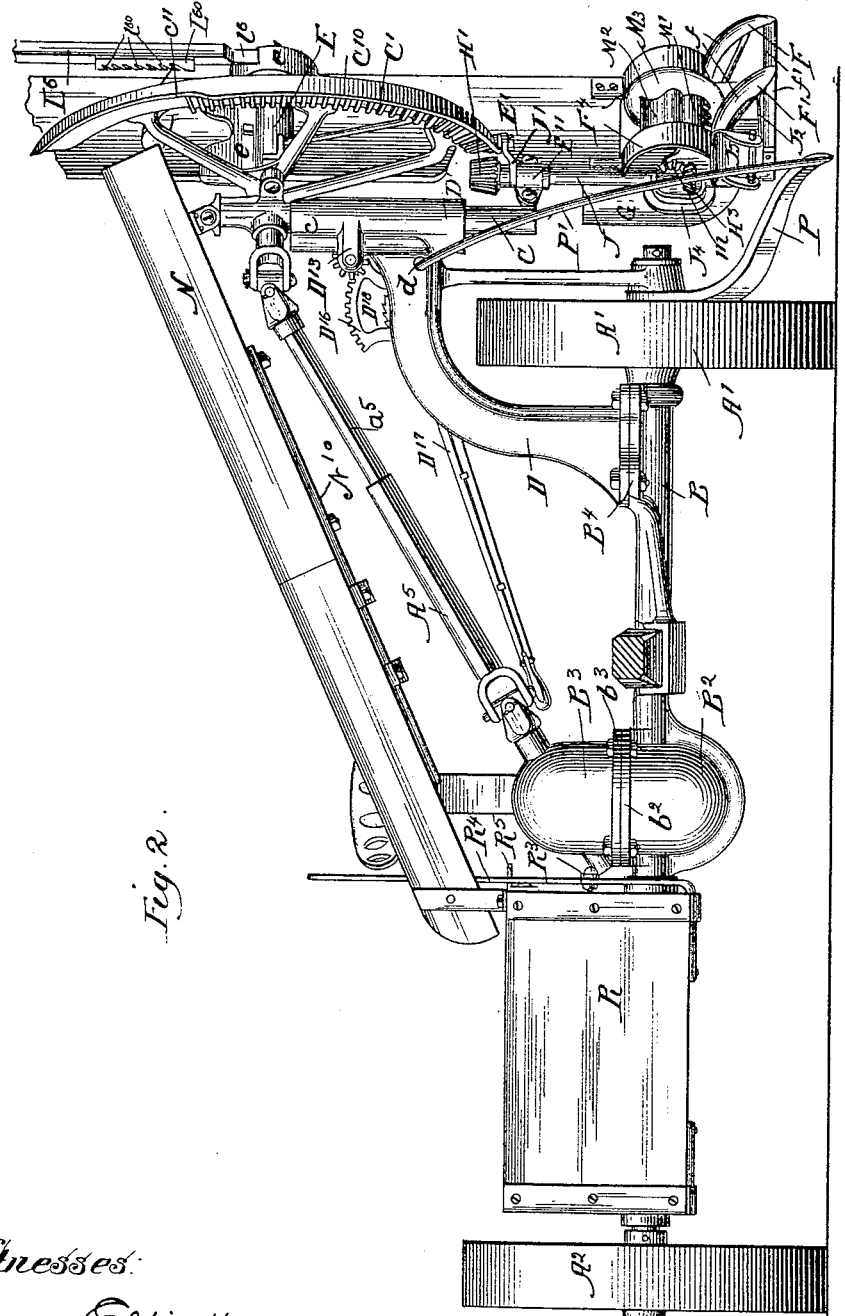
Figure 3:
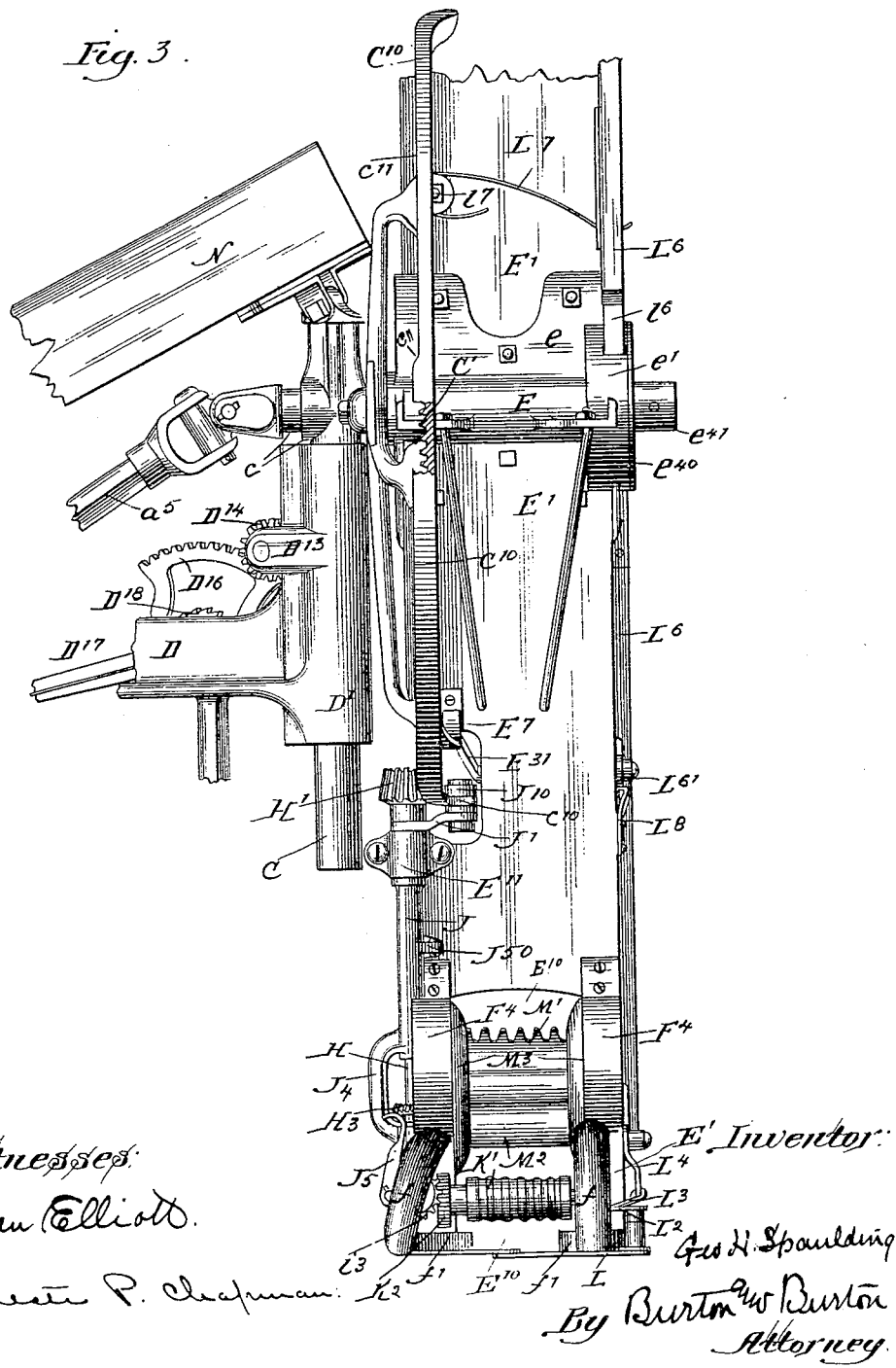
Figure 4:
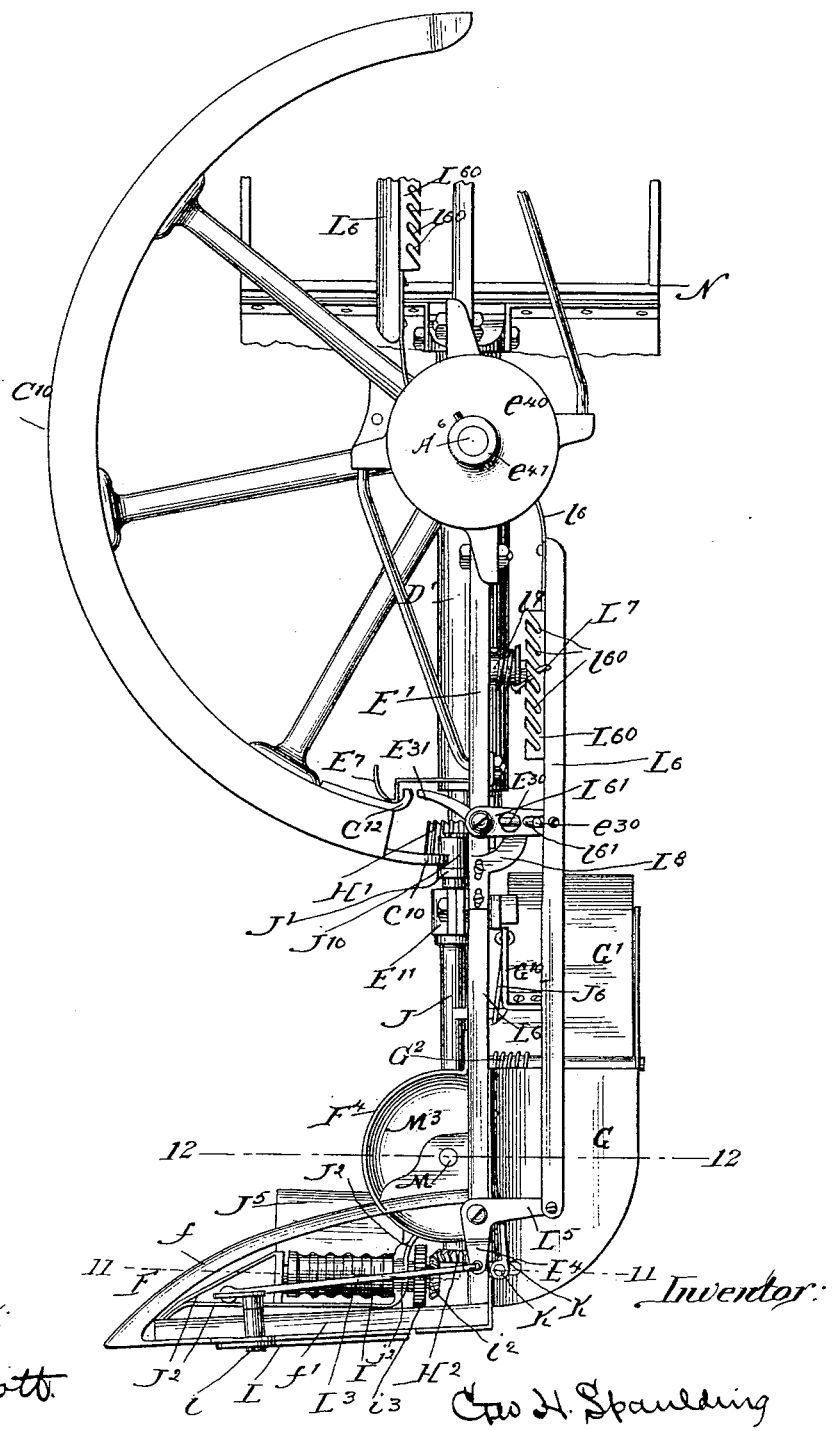
Figure 5:
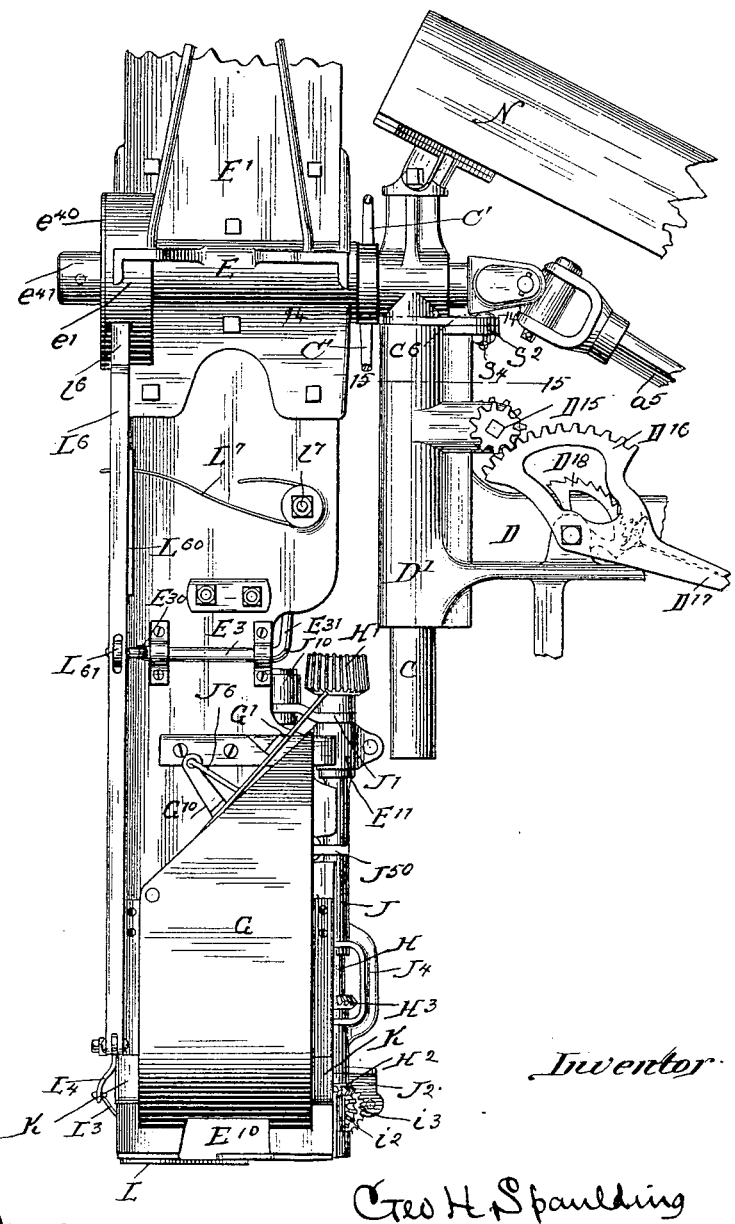

In the drawings, Figure 1 is a plan with the upper picking mechanism, that upon the lower half of the frame being omitted. Fig. 2 is a front elevation with the upper part of the picking-mechanism frame broken away. Fig. 3 is an elevation of the gathering and picking mechanism frame, showing the same portion thereof which appears in Fig. 2 and the adjacent supporting portion of the main frame as seen looking in the direction of the arrow 3 on Fig. 1. Fig. 4 is a side elevation of the same parts shown in Fig. 3, looking in the direction of the arrow 4 on Fig. 1. Fig. 5 is a rear elevation of the same parts shown in Fig. 3, looking in the reverse direction of the arrow 3 on Fig. 1. Fig. 6 is a perspective of the gathering mechanism and portion of the main frame as seen from the forward stubbleward corner looking rearward and stalkward. Fig. 7 is a vertical section through the main axle and main driving-shafts, indicated by the dotted line 7 7 on Fig. 1. Fig. 8 is a bottom plan of the gathering and picking mechanism in the position of rest. Fig. 9 is a similar plan showing the parts in the position occupied just after being tripped into action. Fig. 10 is a similar plan showing the parts in the position occupied after being fully brought into operation, engaging and stripping the stalks. Fig. 11 is a section at the line 11 11 on Fig. 4. Fig. 12 is a section at the line 12 12, showing the parts in the position shown in Fig. 9. Fig. 13 is a side elevation of the clutching mechanism. Fig. 14 is a detail plan of the device for adjusting and securing the gathering-frame in angular relation to the main axle, section being taken at the line 14 14 on Fig. 5. Fig. 15 is a sectional detail plan of the raising and lowering devices, section being taken at the line 15 15 on Fig. 5.

In this invention I aim to provide means for picking the ears from stalks by mechanism which shall be inactive, except when it is actually brought into contact with the standing stalks, tripping mechanism being provided to be actuated by the stalks and trip the picking mechanism into action. I design also to locate the trip-arm between the arms designed to gather the stalks, said gathering-arms being located as near the ground as possible, so that they may encompass or take in between them the stalks as nearly as possible at the point where they emerge from the hill, so that the tripping mechanism will be actuated and will put the picking mechanism into action only when the hill of corn has been "found" by the gatherer-arms. Having thus found the hill at the base of the stalks and thereby encompassed all the stalks of the hill, however divergently they may have been prostrated, I design that the gathering and picking mechanism should rise while encompassing the stalks, thus gathering the latter together and picking the ears from all the stalks as the mechanism travels up on them while the machine advances over the hill. The ears being thus detached from the stalks during an upward movement of the picking mechanism are received in a receptacle which is elevated with the picking mechanism, and when the latter has reached its highest point the ears are dropped and by reason of the elevation thus obtained may be conducted by gravity through a suitable chute into the final receptacle. My picking and gathering mechanism is therefore at the same time an elevator for the ears.

Having thus defined my invention in outline as to its mode of operation, I will describe the construction in detail.

A is the main axle. It has at each end a supporting-wheel. The wheel A' at one end is the drive-wheel, being clutched to the axle by a pawl-and-ratchet mechanism, which causes it to rotate the axle when the machine is traveling forward, but not when it is traveling backward. Any convenient form of pawl-and-ratchet connection may be employed. The wheel A² at the other end of the axle need not be a driving-wheel—that is, it may be loose on the axle and serve merely for support in traveling.

B is a sleeve, which forms a part of the main frame, extending the entire length of the axle between the wheels and constituting the bearing for the same, and toward the end of the sleeve next the wheel $A^2$ the ear-receptacle R, which is a large box, is made fast to the sleeve, suitable flanges B' being formed on the sleeve to afford secure means of fastening the receptacle thereto. At the side of the receptacle toward the drive-wheel A' the sleeve B is expanded into a hood $B^2$ for the gear-wheel $A^3$, which is made fast on the axle A. The hood terminates in the horizontal flange $b^2$, by means of which a counterpart hood $B^3$, which completes the inclosing-case for the gearing, is secured to it. The wheel $A^3$ is a beveled gear-wheel, which meshes with and drives the beveled pinion $A^4$ on the shaft $a^4$, which is journaled obliquely in the bearings $B^{30}$, formed on the hood $B^3$. The upper end of the shaft $a^4$, which protrudes from the gearing-case, is connected by a universal joint to the telescoping shaft made up of the square sleeve $A^5$ and the square shaft $a^5$, which enters it. This combined shaft extends obliquely upward and stalkward, and at the upper end is connected by a universal joint to the main driving-shaft $A^6$ of the gatherer and picker. This shaft $A^6$ is journaled horizontally at the upper end of the spindle C. This spindle extends vertically within the sleeve D', formed at the upper stalkward end of the bracket D, which is secured upon the upper side of the sleeve B at the drive-wheel end thereof, the sleeve being expanded broadly in the flange $B^4$ to make a secure base hold for the bracket. The bracket extends up and overhangs the drive-wheel, having its sleeve D' at the stalkward side of the vertical plane of the wheel, as illustrated. Except for the purpose of adjustment, which will be hereinafter explained, the shaft $A^6$ is to be considered as journaled at the upper end of the bracket D, the spindle adjustable in the bracket being in action rigid therewith and moving therein only for the purpose of adjustment. The shaft $A^6$ extends through its bearing $C^2$, and on said bearing there is suspended the gatherer and picker-frame, while on the stalkward end of the shaft $A^6$, at the end of the bearing $C^2$, there is pinned fast the disk $e^{10}$, which forms part of the clutching mechanism by which the shaft within the bearing is connected to the frame, which is journaled outside of the bearing. This gatherer and picker frame comprises the hub E, through which the bearing $C^2$ extends, and which has radial flanges $e$ diametrically opposite each other, to each of which there is secured the flat arm or board E', which constitutes the gathering and picking mechanism frame, at the extreme end of which the gathering and picking mechanisms are mounted. The length of this arm or board is such as to bring the gathering-arms, which are secured at the lower end of it, when said arm E' depends vertically from the shaft $A^6$, as near to the ground as is deemed necessary, in order to reach the base of the stalks where they spring from the hill.

The gathering and picking mechanism frame is connected to the shaft $A^6$ by the clutch shown in Fig. 13, being loose on the shaft, except when clutched thereto by the action of the tripping mechanism, which will be hereinafter explained. To the lower end of the arm E', on the forward side, there are secured two prows or stalk-gathering arms F F', which project therefrom forward, (considering the device in a position of rest depending from the shaft $A^6$.) These gathering-arms are essentially open brackets, having a broad base at the rear, where they are secured to the arm E' at its lower end, and tapering from said broad base to a sharp point at the forward end, comprising upper and lower bars $f$ $f'$ and open between said bars. They may be made in one or more pieces, as found convenient. As illustrated, the lower bar is a separate piece from the remainder of the bracket, and bolted thereto. To the stalkward gathering-arm F there is pivoted upon a sideward-jutting bracket $f^2$ the trip-arm L, fast on a vertical shaft $l$, journaled in the bracket $f^2$, from the upper end of which shaft there projects the lever-arm $L^2$, to the end of which is connected the link $L^3$, which extends rearward and is connected to the arm $L^4$ of the bell-crank lever $L^4$ $L^5$, to the arm $L^5$ of which there is connected the push-rod $L^6$, at the upper end of which is a finger $l^6$, which extends into the clutch-case $e'$ on the hub E, and when said push-rod $L^6$ is pushed upward operates the clutch to cause the hub E of the gatherer-frame to become engaged with the shaft $A^6$, so as to be rotated thereby. The trip-arm L, it will be observed, extends across or part way across the space between the gathering-arms F and F', and is in position, therefore, to collide with the stalks when the machine, advancing, causes a cluster of stalks, constituting a hill, to be received between the gathering-arms. This trip-arm L, being by such collision pushed backward, communicates through the lever-arm $L^2$, link $L^3$, and bell-crank lever $L^4$ $L^5$ necessary motion to the push-arm $L^6$, and thus when a hill is gathered between the gatherer-arms F and F' the entire gatherer-frame commences to rotate with the shaft $A^6$, rising forward, and thus advancing upward on the stalks. The picking mechanism mounted on this same gatherer-frame performs its functions during this motion, as will hereinafter be described.

To the rear side of the lower part of the arm E' there is secured the ear-pouch or temporary receptacle G, the lower end of the arm E' being cut away at the middle part at $E^{10}$, whereat an opening is made into the receptacle G between the brackets F and F'. To the upper end of the spindle C there is secured the segment-rack C', projecting forward from the spindle and having its rack-teeth on the stubbleward side. Upon the arm E' there is journaled in suitable journal-boxes secured to said arm the shaft H, having at its upper end the pinion H', adapted to mesh with and travel along the rack C', said rack being in a plane at right angles to the shaft $A^6$. Toward the lower end of the shaft H a beveled pinion $H^2$ is made fast. Upon said shaft, also, there is journaled the sleeve J, which most conveniently extends up through the journal-box E'', which supports the upper end of the shaft H, and at its own upper end above the journal-box has the lever-arm J', carrying at its end the abutment, preferably an anti-friction stud and roll $J^{10}$. Upon the margin or periphery of the segment-rack C', outside of the rack-teeth, there is formed the cam-track $C^{10}$, having at its lower end the stalkward-extended portion $c^{10}$ in position to receive the collision of the abutment $J^{10}$, when the arm E' swings forward on its supporting-shaft and rocks the shaft H horizontally in its vertical bearings a quarter of a revolution, which is sufficient to bring the abutment into the plane of the remainder of the cam-track, which thus holds the abutment in that position, while the arm E' continues its rotary motion over its shaft $A^6$. From the lower end of this sleeve J the bracket $J^2$, which constitutes a reel-arm to gather the stalks rearward after they have been gathered between the gathering-arms F F', projects horizontally and then downward and thence horizontally, and has the bearings $j^2$ for the horizontal shaft $i$ of one of the picking-rolls I. Underneath the bracket $J^2$, at the stubbleward end of the shaft $i$, there is secured to said shaft the beveled gear $i^2$, which meshes with and is driven by the beveled gear $H^2$, fixed on the shaft H, as described. Between this beveled gear and the bearing of the shaft in the bracket $J^2$ there is made fast the spur-gear $i^3$. To the lower part of the arm E' are fastened—one near each edge on the back side of the arm—the yielding journal-boxes K K for the shaft $k$ for the rear picking-roller K', rigid with which is the spur-gear $K^2$, equal with and adapted to be driven by the spur-gear $i^3$, made fast, as described, on the shaft of the forward picking-roller.

When the gatherer-frame E' starts forward after being clutched to the shaft $A^6$ by the action of the tripping mechanism described, the sleeve J, rocked upon the shaft H by the collision of its lever-arm J' with the cam $C^{10}$, carries around with it in its quarter-revolution the reel arm or bracket $J^2$ and the picking-roller journaled therein, said bracket and roller gathering rearward, as they swing, the stalks which have tripped the gathering mechanism into action and bringing the spur-gear $i^3$ at the limit of that rocking motion into mesh with the spur-gear $K^2$, and the continued motion of the frame E' about the shaft $A^6$ causing the pinion H' to travel along the rack C' and be rotated thereby, and so rotate the shaft H, which communicates rotary motion by means of the beveled gear $H^2$, through the beveled gear $i^2$, to the forward picking-roller I, and thence through the spur-gears $i^3$ and $K^2$ to the rear picking-roller K. The train of gearing from the rack C' to the picking-rollers is calculated to give to the rollers a peripheral speed slightly greater than that at which they advance up along the stalks which are grasped between them. Their peripheral motion, also, it will be observed, at their proximate surfaces is the reverse of their advancing motion along the stalks—that is, they roll the stalks downward between them as fast as or a little faster than they advance bodily upward along the stalks, whereby they are prevented from dragging the stalks or pulling on their roots, having, on the contrary, a slight tendency to push the stalks downward.

Upon the shaft H, in addition to the beveled gears above mentioned, there is made fast, also, the beveled gear $H^3$, the sleeve J being interrupted and provided with the yoke $J^4$, spanning the space occupied by said beveled gear and the gear hereinafter mentioned, which meshes with it. In journal-bearings, which are most conveniently provided in the upper rear parts of the brackets which constitute the gathering-arms F F', there is journaled the shaft M, which has at one end the beveled gear $m$, meshing with and driven by the beveled gear $H^3$. This shaft has rigid with it two or more ear-breaking blades M' $M^2$, called "breakers," which revolve for a short distance above the picking-rolls I and K, their function being to engage and break off the ears from the stalks and discharge them back into the receptacle or pouch G. One or more of these breakers is serrated or toothed, or made to terminate at its operating-edge in fingers $m^2$, the notches between which are calculated to be large enough to admit the stalks, so that the fingers will more effectively engage the ears and break them off. Preferably upon the shaft M there are also the cheeks $M^3$ $M^3$ at the ends of the blades M' $M^2$ and making junction therewith, and of course rigid therewith and with the shaft M, whereby leaves on the stalk are prevented from being wrapped around the shaft or becoming engaged with the gearing. For a like purpose, also, the guards $F^4$ are provided as a part of the bracket-gathering arms F and F', extending from said arms coincident with the edges of the cheeks upward and rearward to the arm E', and overhanging, therefore, the gearing and the bearings of the several shafts, preventing the leaves from falling into them. When the ears grow low down on the stalks, some ears will be detached before the arm E' and the mechanism thereon, including the receptacle G, has risen far enough to make it certain that the ears will fall back into the receptacle, and sometimes the ears will be pinched off by the rolls I and K without having been engaged by the revolving breakers M' $M^2$. In order that such ears may not fall forward and escape, instead of passing backward in the receptacle, I have provided the lip $J^5$ on the bracket $J^2$, preferably pivoted thereto and having the springs $j^5$, tending to hold it upward in front of the space in which the picking-blades revolve above the rolls I and K, and by means of this any ears which are detached before the mechanism at the end of the arm $E'$ has risen far enough to insure that the ears will fall back into the receptacle will at least be retained until the arm $E'$ rises far enough, so that they will fall back into the receptacle with the rest.

The rack $C'$ terminates a little above the horizontal plane of the shaft $A^6$, so that after the arm $E'$ has risen a little above the horizontal position the pinion $H'$ passes off from the rack and the picking mechanism ceases to be actuated, and at the same instant or about the same instant the abutment $J^{10}$ falls into the depression $c^{11}$ in the cam-track $C^{10}$, whereby the sleeve J is permitted to rock slightly on the shaft to permit the picking-roll I to swing forward and relax its grasp upon the stalks held between the rolls, so that they may readily pull out from between them as the picking mechanism on the arm $E'$ continues to rise. The cam-track $C^{10}$ extends on up in an arc about the axis of the shaft $A^6$, and the abutment $J^{10}$, bearing against the same, continues to hold the sleeve J and the parts connected with it in substantially the position to which they were moved by the first collision of the abutment with the sideward-jutting end $c^{10}$ of the cam-track until the arm $E'$ is nearly vertical, and the receptacle G above the upper end of the chute N. This chute is sustained at one end upon the upper end of the spindle C and extends thence downward and stubbleward above the shaft and has its discharge over the receptacle R. The upper end $c^{11}$ of the cam $C^{10}$ is deflected and terminates, as stated, in such position that the abutment $J^{10}$ runs off of it just before the arm $E'$ reaches a vertical position. The sleeve J has the lever-arm $J^{50}$, to which is connected the link $J^6$, which at the other end is connected to the lever-arm $G^{10}$ of the cover $G'$ of the receptacle G. This cover is hinged to the receptacle at the upper edge of the stalkward side and is provided with a spring $G^2$, tending to withdraw the cover from the mouth of the receptacle.

The connection of the cover $G'$ to the sleeve J by the link $J^6$ causes the cover to be held over the mouth of the receptacle so long as the sleeve J is controlled by the engagement of the abutment $J^{10}$ of its lever-arm $J'$ with the cam-track $C^{10}$. This is the case through all the described rising movement of the gathering and picking mechanism of the arm $E'$ and until the abutment runs off the cam-track at the upper end, as described, when the arm $E'$ is nearly vertical. When this happens, the spring $G^2$ throws the cover down—that is, off from the mouth of the receptacle—that motion of the cover also, by means of the link $J^6$, rocking the lever J back to its initial position on the shaft H, and the receptacle being opened the contents thereof descend, guided by the cover, which constitutes a partial chute, into the chute N, by which they descend by gravity into the receptacle R.

I have thus far described the gathering and picking mechanism upon one of the arms $E'$. A second arm will in all cases be provided, extending in the opposite direction from the hub E, so that when one of such arms has reached the vertical position above the chute and is about to dump the contents of the receptacle G the other arm will stand in the initial position from which the one described started, and in order that the emptying-receptacle may halt at least for an instant while its contents descend from it I provide upon each of the arms $E'$ the rock-shaft $E^3$, journaled upon the rear side of said arm and having one lever-arm $E^{30}$ projecting rearward and adapted to be actuated directly or indirectly by the bar $L^6$ and another lever-arm $E^{31}$ projecting forward through or past the edge of the arm $E'$ and upon the lower end of the rack $C'$. I provide the projecting tooth $C^{12}$, which stands in the path of the lever-arm $E^{31}$, in that position of the latter which it occupies when the push-rod $L^6$ is in its normal position—that is, the position which it occupies when the trip-arm is free from the pressure of the stalks. This is the case when the arm $E'$ depends vertically from the shaft $A^6$ before the gatherer-arms F F' have encountered a hill, but not after the trip has been actuated, and the arm $E^{31}$ has been tripped downward by the action of the push-bar $L^6$ engaging the lever-arm $E^{30}$, as above stated. If, therefore, during the half-revolution of the shaft $A^6$, which has carried one of the arms $E'$ from its lowest to its highest position, the machine has not advanced over the ground the distance from one hill to the next, the second arm $E'$—that is, the one opposite the one whose action has been followed in the above description—will be in such position that its trip-arm L will be free from actuation of the stalks at the moment the first arm is dumping the contents of its receptacle G, and therefore the lever-arm $E^{31}$ on that second arm $E'$ will be in position to collide with the stop-tooth $C^{12}$ on the rack and arrest the rotary motion, so permitting the contents of the receptacle G to be discharged into the chute.

It will be observed that while the reel-arm $J^2$ has been swung rearward the quarter-revolution necessary to bring the picking-roll which it carries into co-operative relation with the rear picking-roll it will sweep the stalks which are between the gathering-arms F F' off from the trip-arm L and release the latter, which will be immediately caused to swing forward to its normal position, a spring $L^7$ being provided, mounted upon a stud $l^7$ upon the back side of the arm $E'$, said spring engaging the push-arm $L^6$ to resist and reverse the motion communicated to it by the trip-arm L through the links and levers described, and thereby to reverse the motion of said links, lever, and trip-arm.

I will now describe the clutching mechanism by which the gatherer and picker frame is clutched to the shaft $A^6$. At the stalkward end of the hub E there is formed the clutch-case $e'$, integral with said hub. The bearing $C^2$ of the shaft $A^6$ protrudes into the case $e'$ at the center thereof, and on the protruding end of said bearing there is journaled the sleeve $e^2$, which has the feather or interior tooth $e^{20}$ protruding into a longitudinal groove $C^{20}$ in the protruding portion of said bearing, said groove being, however, considerably wider than the feather, so that the sleeve $e^2$, notwithstanding the engagement of said feather in the groove, is capable of rotary movement on the bearing $C^2$ to the extent of a few degrees. From the sleeve $e^2$ project two diametrically-opposite cams $e^{22}$ and $e^{23}$. To the back or bottom of the case $e'$ there is pivoted a dog or pawl $e^3$, which has a shorter tooth $e^{30}$ in such position that it rides on the cams $e^{22}$ and $e^{23}$. Its longer tooth—the pawl proper $e^3$—is adapted to ride on and be engaged by the ratchet $e^4$, which is rigid with the disk $e^{40}$, which forms the cover of the case, and which has the hub $e^{41}$, by which, as described, it is pinned to the shaft $A^6$. The sleeve $e^2$ has a projection $e^{21}$ about half-way between the two cams $e^{22}$ and $e^{23}$, overhanging the finger $l^6$ of the push-bar $L^6$. A spring $e^5$, connected to the case and to the dog $e^3$, tends to force it into engagement with the ratchet $e^4$ when such engagement is not prevented by one of the cams $e^{22}$ or $e^{23}$, as described. When the arm $E'$ is at rest dependent from its shaft $A^6$ and stopped by the engagement of the lever-arm $E^{31}$ against the tooth $C^{12}$, as above described, the position of the parts in the clutch is such that the dog or pawl $e^3$ is held out of engagement with the ratchet-disk $e^4$ by reason of the fact that its shorter tooth $e^{30}$ is resting upon the point of the cam $e^{22}$. When the push-bar $L^6$ is pushed up by the operation of the tripping mechanism hereinabove described, its finger $l^6$, engaging the projection $e^{21}$, actuates the sleeve $e^2$ and pushes it around on the bearing $C^2$ as far as the play of the feather $e^{20}$ in the groove $C^{20}$ will permit. This distance is sufficient to carry the point of the cam $e^{22}$ out from under the end of the tooth $e^{30}$ of the pawl and allow the longer tooth of the pawl $e^3$ to fall into engagement or be forced by its spring $e^5$ into engagement with the ratchet-wheel $e^4$, and thereby the motion of the shaft $E^6$ is communicated to the hub E, and the gatherer and picker frame is rotated, as hereinabove described, until the tooth $e^{30}$ of the pawl encounters the cam $e^{23}$ and by the pawl is lifted out of engagement with the ratchet. It will be noticed that the first effect, however, of the collision of the pawl-tooth $e^{30}$ with the cam $e^{23}$ will be to push the sleeve $e^2$ around on the bearing $C^2$ as far as the width of the groove $C^{20}$ will permit, thus restoring the sleeve to its initial position, where it is ready again to be actuated by the push-finger $l^6$ at the next occasion of tripping. The point in the rotation of the arm $E'$ at which the pawl will be disengaged from the ratchet by the cam $e^{23}$ is that at which the abutment $J^{10}$ is resting upon the stalkward-deflected upper end of the cam-track $C^{10}$ on the rack $C'$. The spring $G^2$, acting through the mechanism above described, tending to rock the sleeve J and force the arm $J'$ stalkward by reason of the fact that the abutment upon said lever-arm at this point rests upon the obliquely-deflected portion $c^{11}$ of its cam-track, operates to impel the arm $E'$ onward in its rotary course a short distance just at the instant that the pawl $e^3$ is passing out of engagement with the ratchet, whereby the disengagement of the pawl and ratchet is completely effected—that is to say, the spring $G^2$, operating through the lever-arm $J'$ and the deflected upper end of the cam-track $C^{10}$, serves to bring the frame $e'$ "home" after it is unclutched from its driving-shaft, as described. In order that the trip may not be too sensitive and yield to the pressure of mere stubble or weeds, and in order that it may, on the contrary, yield only to such pressure as might be given it by a hill of corn, or at least a firmly-rooted stalk, the spring $L^7$ should be of sufficient strength to resist the slight pressure of such things as grass, stubble, and weeds; and in order that the pressure of this spring may be regulated according to experience, so that it shall not be greater than necessary, and thereby cause the machine to be too difficult to trip into action, and yet may be as strong as necessary to guard against any undesirable tripping, I provide the notched bar $L^{60}$, secured upon the push-bar $L^6$, having a series of notches $l^{60}$, in any of which the end of the spring $L^7$ may be lodged. I have shown and provided a guide-link $L^{61}$, pivoted on the edge of the bar $E'$, and pivoted, also, to the push-bar $L^6$ about midway in the length of the latter, this link being of the same length as the arm $L^5$ of the bell-crank lever $L^4 L^5$, so that it and said arm are equivalent to two parallel links, which give the bar a reliable motion. It is convenient to connect the arm $E^{30}$ of the rock-shaft $E^3$ to this link $L^{61}$, which I do by providing the slot $l^{61}$ in said link and allow a sideward-jutting projection $e^{30}$ of the arm $E^{30}$ to extend into such slot.

In order to stop the push-bar at the position which corresponds to the normal position of the trip L—that is, the position when it is free from actuation by the stalks—I secure to the edge of the bar $E'$ the stop-bracket $L^8$, which juts underneath the link $L^{61}$, stopping it at the desired point, where it is held, as described, by the pressure of the spring $L^7$.

When the machine, advancing, encounters stalks which ought to trip it into action, it is evident that this result will not follow unless the frame comprising the arm $E'$, which supports the mechanism, is prevented from swinging rearward under the pressure of the stalks instead of advancing upon them, and thereby causing the trip to be pushed rearward. To prevent it from thus yielding bodily to the stalks and so rendering the trip inoperative, I provide the spring catch or hook $E^7$, which is of the nature of a bracket secured to the forward side of the arm $E'$, having a tooth sloping at the forward edge and square at the rear edge, adapted to engage the spring over and become engaged in front of the tooth $C^{12}$ at the lower end of the segment-rack C. When the trip L encounters a hill of stalks, said trip, resisting them by the pressure of the spring $L^7$, causes the arm $E'$ to operate rearward and to move in that direction as far as it is permitted by the engagement of the spring-tooth $E^7$ with the rigid tooth $C^{12}$, and I preferably so locate these parts and the end of the arm $E^{31}$ of the rock-shaft $E^3$ that a very slight motion will be possibly sufficient to carry the end of the arm $E^{31}$ out of contact at least with the rear side of the stop-tooth $C^{12}$, so that the friction, if any, between said lever-arm and stop-tooth, which, if they were in contact, might tend to hinder the action of the trip, is prevented and the resistance of the trip made to depend entirely upon its spring $L^7$. It will be understood that when the arm $E'$, having completed its revolution, returns to its position of rest the spring-tooth $E^7$ will snap over the tooth $C^{12}$ and lock it automatically.

The action of the above-described mechanism, it will be seen, is to leave the stalks standing and merely to strip them of their ears, which are thus gathered in the receptacle, two or more gathering-frames and mechanisms thereon being employed upon the same hub, each one following in behind the other successively, and if they revolved in a plane parallel to the direction of travel the machine would encounter the stalks previously stripped by the preceding gatherer and would be tripped into action uselessly, and usually before the stalks were released from the gatherer which was stripping them. It would further result, if the plane of rotation were parallel with the direction of travel, that each gathering mechanism would encounter a hill of stalks in advance of the one on which it was operating while it was at its horizontal position and would be in danger of becoming entangled with and tripped by the upper ends of such stalks, and thereby prevented from coming to rest at the proper moment for discharge of the contents of the receptacle G. In order to prevent these results, the shaft $A^6$ is set oblique to the vertical plane of the axle A, so that the arms $E'$ revolve in a vertical plane oblique to the direction of travel, which is the direction of the row of hills of corn which is being gathered, so that each gathering-arm and its mechanism attacks the hill by striking obliquely across the row, so that it cannot in one revolution encounter more than one hill. The gearing-train is so calculated with respect to the size of the drive-wheel that a half-revolution of the shaft $A^6$ is made, carrying the driving-train through its entire action from tripping to discharge, while the machine advances over a distance somewhat less than the distance between successive hills of corn as usually planted. Thus, the usage being to plant corn from three feet four inches to three feet eight inches apart, I construct this machine so that the half-revolution referred to is made during three feet of travel of the machine. The gatherer will thus come to the position of rest depending from its shaft—the initial position in the above description—from four to eight inches before encountering the hill upon which it is to operate, and from that position it will advance to the hill by the mere travel of the machine directly forward, and I have shown and constructed the gathering-arms at such an angle to the plane of rotation of the arms $E'$ that they will bear the proper relation to the hill to gather its stalks by advancing upon it directly with the travel of the machine—that is, the stubbleward gatherer-arm diverging stubbleward from the direct line of advance, but not so much as to make its angle to the plane of rotary motion excessive or such as to cause it to receive too great lateral pressure upon it from the stalks when the rotation of the arm $E'$ commences.

The reel arm or bracket $J^2$, having the function of gathering the stalks rearward, assisting the gathering-arm in straightening them up, might be subject to excessive strain and also cause the machine to be retarded if any of the stalks which it should seize and reel in should by reason of their being prostrated stubbleward have their heads caught under the drive-wheel at the same time that their butts were grasped by the reel-arm; and to prevent such possibility I provide the arm P, which I call a "stalk-lifter," pivoted on the end of the axle stalkward from the drive-wheel and extending a considerable distance forward of the vertical plane of the front edge of the wheel, and having the arm $P'$ diverging from its forward point upward and rearward to a point higher than the drive-wheel. This arm, which is of the nature of an outrider or scout for the divider-arm, is designed to hang normally close enough to the ground so that its point will enter under any prostrated stalks and lift them, guiding them upward by its upper bar, so that the heads cannot be caught under the drive-wheel and so that they will with certainty come within reach of the gatherer-arm and so be reeled in by the reel $J^2$.

I prefer to pivot the stalk-lifter rather than to have it secured rigid to the frame, so that it may be readily lifted to clear the ground and an obstacle which might prevent its action or cause it to become entangled and impede the machine, and in order that the upper bar $P'$ may extend back as far as the bracket D, and thereby prevent any stalks which have been lifted by it from falling down again at the end of it, and at the same time permit the forward point to be lifted to clear obstacles, I extend this rear arm through a hole $d$ in the bracket D near the upper part, as seen in Fig. 2.

If desired, husking rolls may be located in the chute N, which will strip the husks from the ears while they are passing from the receptacle G down into the receptacle R. Any familiar device for this purpose may be employed or omitted at will.

The bottom of the receptacle R is preferably made of dumping-sections R', pivoted to the body of the receptacle, connected by the link $R^3$, operated by the spring hand-lever $R^4$, which extends up within reach of the driver and is provided with suitable locking-catch $R^5$ in a manner which needs no further explanation. The bearing of the gatherer and picker frame is formed on the top of the spindle C, instead of being rigid with the bracket D, in order to permit certain adjustments of the entire gathering and picking mechanisms. These adjustments are, first, an axial adjustment of the spindle C in the sleeve D', by which the angle of the plane of rotation of the gatherer-frame to the direction of travel of the machine may be adjusted as may be found desirable to adapt it to the corn according to the distance by which the hills are separated; second, a vertical adjustment of the spindle in the sleeve D', in order that the gathering-arms may at their lowest position be only low enough to be certain to gather the stalks and strip off the lowermost ears therefrom. This will vary in different corn, and when the stalks are very high usually the lowest ears are correspondingly high from the ground, and needless work will be performed by gathering the stalks close down to the ground unless they are badly prostrated. Furthermore, when the stalks are so high the topmost ears are located higher than on shorter stalks, and in order to insure picking these highest ears the gatherer needs to be adjusted to rise higher than in other cases. The entire device will therefore be adjusted vertically with a view to both these purposes by omitting that which is needless at the lower part of the machine and performing all necessary work by traveling high enough to catch the topmost ears. The spindle is raised and lowered in the sleeve by means of the rack S, which is located in a longitudinal groove $D^{11}$ in the stubbleward side of the sleeve D', its upper end standing under the shoulder $c$ at the upper end of the spindle—that is to say, the spindle being supported by its shoulder $c$, resting upon the upper end of the rack. An opening $d^{12}$ is made through from the outside of the bearing D' into the groove $D^{11}$, through which a small portion of the rack is exposed, and adjacent to said bearing I provide the lugs $D^{13}$, which afford a bearing for the spur-wheel $D^{14}$, which protrudes through the opening $d^{12}$ to engage the rack. On the shaft of this spur-wheel $D^{14}$, most conveniently upon the rear end, I make fast a pinion $D^{15}$, and upon the bracket D, I pivot the gear-segment $D^{16}$, which meshes with the pinion $D^{15}$ and has a handle or lever-arm $D^{17}$, extending stubbleward to a point within reach of the driver. Integral with or secured to the pivot-bearing of the gear-segment $D^{16}$, I provide a notched segment $D^{18}$, past which the lever-arm $D^{17}$ vibrates, and on said lever-arm I mount a catch operated by a rod and trigger, the latter located in the vicinity of the handle, all of familiar construction, by means of which the lever may be locked to the notched segment $D^{18}$ and disengaged at will to permit it to be vibrated in a vertical plane to cause the gear-segment $D^{16}$ to rotate the pinion $D^{15}$, and thereby the spur-gear $D^{14}$, which, engaging with the rack, raises and lowers it, and thereby the spindle and the entire gathering-frame supported thereon. It will be understood that the descent is effected by gravity simply controlled by the segment and lever-handle, and, as is most convenient, the notched segment $D^{18}$ is of ratchet form, and the locking device which engages it is a pawl which travels over the ratchet automatically in the direction necessary to raise the spindle, but requires to be disengaged by means of a trigger and connecting-rod when the spindle and gatherer-frame are to be lowered. In order to provide for the adjustment of the spindle axially to change the angle at which the gathering mechanism stands with respect to the direction of travel, I provide the corresponding flanges or flangular lugs $S^2$ on the rack S and $C^6$ on the spindle C, the latter overhanging the former, being of sectoral form about the axis of the spindle and adapted to be clamped to it by the clamp-bolt $S^4$, which is screwed into the lug $S^2$, passing through the curved slot $C^{60}$ in the sectoral lug $C^6$, said slot being in an arc about the axis of the spindle, so that the spindle may be rotated to the extent allowed by the length of the slot and clamped in any position to which it may be thus adjusted by the clamp-bolt $S^4$. The rack S being confined in the groove $D^{11}$, the adjustment of the spindle with respect to the rack becomes an effective adjustment of the same with respect to the bracket D and all the other fixed parts of the machine, but without preventing the vertical adjustment of both rack and spindle together, hereinabove described.

If desired or found advantageous, the rack C' may be continued as far up as the cam $C^{10}$, so that the picking-rollers may continue their action so long as the gatherer-frame is rising. The advantage of thus continuing the teeth and the action of the rollers caused by them is that in case any stalk should be broken or pulled up by the action of the picking mechanism and should not fall freely out from between the rollers their continued action would roll the stalk down and out from between them, even though by reason of its being detached from the ground the travel of the machine would not cause it to be withdrawn.

The chute N is made in two telescoping sections, the upper section N' being pivotally connected to the top of the spindle C and the lower pivotally supported at $n$ on the receptacle R. The telescoping joint between the two sections may be formed, as shown, by giving the bottom of the upper section the under projecting lip $N^{10}$ and the overhanging lip $N^{11}$ and giving the sides the interior lips $N^{12}$ $N^{12}$, which form guides for the upper end of the lower section, permitting the two sections to separate when the spindle C is elevated, as shown in dotted line in Fig. 7.

I claim—

1. In a corn-harvester, in combination with the stalk-reel arm and its operating-train, a trip-arm by whose displacement said reel-operating train is engaged with the driving-train, said trip-arm located in such position as to encounter and be displaced by the standing stalks as the machine advances, substantially as set forth.

2. In a corn-harvester, in combination with the main frame, a frame pivoted thereto and depending from its pivot and having at its free end stalk-gathering arms adapted to receive between them the standing stalks as the machine advances, the driving-train and a clutch by which it is connected to said pivoted frame to rotate the latter about its pivotal support on the main frame, and a trip-arm suitably connected to the clutch to operate the same and located in position to encounter the standing stalks as the machine advances, substantially as set forth.

3. In a corn-harvester, in combination with the forwardly-projecting stalk-gathering arms F F', a stalk-reel arm and the train which operates it to swing it rearward into the space between the stalk-gathering arms, the clutch which connects said train to the driving-train, and a trip-arm which operates said clutch, standing normally between the stalk-gathering arms in position to encounter the standing stalks as the machine advances, whereby the reel-arm is brought into action only after the stalks are actually received between the stalk-gathering arms, substantially as set forth.

4. In a corn-harvester, in combination with the main frame, a frame pivoted thereto, the driving-train and a clutch by which it is connected to the pivoted frame to rotate it on its pivotal support, stalk-gathering arms projecting forward from said pivoted frame, and a reel-arm pivotally supported on said pivoted frame and adapted to swing across the space between said gathering-arms, the train which operates said reel-arm deriving motion from the motion of said pivoted frame, a trip-arm standing normally in the space between the stalk-gathering arms and connected with the clutch to operate the same, whereby the pressure of the stalks upon the trip-arm causes the pivoted frame to be revolved and operate the reel-arm to cause it to gather the stalks rearward, substantially as set forth.

5. In a corn-harvester, in combination with the main frame, a frame pivoted thereto, the driving-train and a clutch which connects it to said pivoted frame, stalk-gathering arms projecting forward from the pivoted frame, picking mechanism located at the rear of said forwardly-projecting stalk-gathering arms, the train by which said mechanism is operated deriving motion from the motion of the pivoted frame, and a trip-arm normally standing in the space between the stalk-gathering arms and connected to the clutch to operate it, whereby the pressure of the stalks received between the gathering-arms causes the pivoted frame to be revolved and the picking mechanism to be operated, substantially as set forth.

6. In a corn-harvester, in combination with the rear picking-roller K, the stalk reel-arm and the train which operates it to swing it rearward toward the rear picking-roller, and the clutching mechanism which connects said reel-operating train to the driving-train, the forward picking-roller mounted on said reel-arm, the trip-arm normally standing forward of the rear picking-roller in position to encounter the standing stalks as the machine advances, and connections therefrom to the clutch to operate the latter, whereby the forward picking-roller is caused to co-operate with the rear picking-roller only after the stalks have been presented against the trip-arm in front of said rear picking-roller, substantially as set forth.

7. In a corn-harvester, in combination with the forwardly-projecting stalk-gathering arms, the reel-arm and the train which operates it to swing it rearward into the space between said stalk-gathering arms, the rear picking-roller located at the rear end of said stalk-gathering arms, and the forward picking-roller mounted on said reel-arm, the train which operates the rear picking-roller, a clutch which connects the reel and picking-roller operating trains with the driving-train, and a trip-arm standing normally between the stalk-gathering arms and connected to the clutch to operate the same, whereby the pressure of the stalks received between the gathering-arms causes the reel to close upon such stalks and engage them between the picking-rollers, substantially as set forth.

8. In combination with the rear picking-roller K and its operating-train, the gear-wheel $K^2$, fixed on the shaft of said roller, the reel-arm adapted to swing rearward toward the rear picking-roller and having the forward picking-roller mounted thereon, and the gear $i^3$, rigid on the shaft of said forward picking-roller and in position to mesh with the gear-wheel $K^2$ when the reel is swung rearward, substantially as set forth.

9. In combination with the revolving picking-frame, the picking-roller at the free end, and the receptacle in the rear of the roller, the reel-arm having one of the rollers journaled on it and the train which swings it rearward and having the lip $J^5$ above the forward roller to detain the detached ears until the frame has revolved up far enough to cause them to fall into the receptacle.

10. In a corn-harvester, in combination with the main frame, a frame pivoted thereto, having at a distance from its pivot stalk-gathering arms, and a trip-arm by whose displacement the pivoted frame is engaged with the driving-train and caused to be rotated thereby, said trip-arm standing normally in position to encounter and be displaced by the standing stalks as the machine advances, substantially as set forth.

11. In a corn-harvester, in combination with the main frame, a frame pivoted thereto upon a horizontal pivot and normally depending from such pivot, picking mechanism mounted on the free end of such depending frame, and the driving-train by which such frame is rotated about its pivot as the machine advances to cause the end having the picking mechanism to rise along the stalks and strip the ears therefrom, the rotary motion of said pivoted frame about its horizontal pivot being in a plane which crosses the direction of travel of the machine, whereby the stalks are bent sidewise, as distinguished from forward, in the direction of the row of hills which is being operated upon, substantially as set forth.

12. In a corn-harvester, in combination with the main frame, a frame pivoted thereto on a horizontal pivot and normally depending from such pivot, picking mechanism mounted at the free end of such depending frame, and the driving-train by which such frame is rotated on its pivot as the machine advances to cause the end having the picking mechanism to rise along the stalks and strip the ears therefrom, the pivot of said pivoted frame being oblique to the direction of travel of the machine, whereby said frame is revolved obliquely across the row of stalks upon which it operates, substantially as and for the purpose set forth.

13. In a corn-harvester, in combination with the main frame, a frame pivoted thereto on a horizontal pivot oblique to the direction of travel of the machine and normally depending from such pivot, picking mechanism mounted at the free end of such depending frame, the driving-train and a clutch by which it is connected to the pivoted frame to rotate the same about its pivot, a trip-arm normally standing in position to encounter the standing stalks as the machine advances, and connections therefrom to the clutch to operate the same, whereby the pivoted frame advances directly with the travel of the machine until the trip-arm encounters the standing stalks and then is rotated obliquely across the row of stalks, substantially as set forth.

14. In a corn-harvester, in combination with the picking-rolls adapted to grasp the stalk and roll it downward between them, an ear-breaker having the shaft substantially parallel to the axes of the rolls and located at the side thereof from which the stalks are drawn through the rolls, and having a longitudinal radial blade revolving downward, as respects the stalks, to engage and break off the ears therefrom, substantially as set forth.

15. In combination with the picking-rollers K and I, the revolving ear-breaker having its shaft substantially parallel to the axes of the rollers and its picking-blades revolving toward the rollers on the side toward the stalks, one or more of said blades being toothed or provided with fingers $m^2$, substantially as and for the purpose set forth.

16. In a corn-harvester, in combination with the main frame, a frame pivoted thereto on a horizontal pivot and normally depending from such pivot, picking mechanism mounted at the free end of such depending frame, the driving-train by which such frame is rotated about its pivot as the machine advances to cause the end having the picking mechanism to rise along the stalks and strip the ears therefrom, a pouch or receptacle G on said pivoted frame in position to receive the ears as they are detached by the picking mechanism, and a suitable conveying-channel having its receiving end in position to receive the contents of said pouch when the pivoted frame has passed above the horizontal position in its rotation and its discharge end is at the opposite side of the drive-wheel, substantially as set forth.

17. In a corn-harvester, in combination with the main frame, a frame pivoted thereto, located at the stalkward side of the drive-wheel normally depending from such pivot, picking mechanism mounted at the free end of such depending frame, the driving-train by which such frame is rotated about its pivot as the machine advances, the pouch G, in position to receive the ears from the picking mechanism, having the trap-door cover G', the chute N, having its receiving end elevated at the stalkward side of the vertical plane of the drive-wheel, its discharge end depressed on the opposite side of the drive-wheel, and the locking device by which the cover G' is held in place, closing the receptacle, and released when the said receptacle is inverted above the receiving end of the chute, whereby the contents of said receptacle are at that time discharged into the chute, substantially as set forth.

18. In a corn-harvester, in combination with the main frame having a horizontally-extended arm, the main driving-train comprising the shaft $A^6$, protruding through said arm, the picking-frame E', journaled on said arm and adapted to be revolved thereabout, and the clutching mechanism having its co-operating parts secured, respectively, to the protruding end of the shaft and to the corresponding end of the hub of the frame E', substantially as and for the purpose set forth.

19. In a corn harvester, in combination with the main frame, a frame having picking mechanism upon it, said frame being pivoted on a horizontal pivot, and the driving-train connected to said main frame and adapted to revolve it about its said horizontal pivot, said horizontal pivot being pivoted to a rigid portion of the main frame on a vertical pivot, whereby the revolving picking-mechanism frame may be adjusted to vary the angle of its plane of rotary motion to the direction of travel of the machine, substantially as set forth.

20. In a corn-harvester, in combination with the main frame, the main driving-train thereon and the picking-mechanism frame pivoted to the main frame upon a horizontal pivot and revolved thereabout by the driving-train, said horizontal pivot being vertically adjustable on the main frame, substantially as and for the purpose set forth.

21. In combination with the picking-mechanism frame, the bracket D, having the sleeve D', the spindle C, adapted to enter said sleeve and having rigid with it the pivot of the picking-mechanism frame, said sleeve having the groove $D^{11}$, opening into the bearing of the spindle therein, the rack S, located in said groove, the spindle being provided with a stop-shoulder which rests upon the upper end of said rack, a gear journaled on the bracket D and meshing with the rack, and suitable operating mechanism whereby the gear may be rotated to raise and lower the rack and thereby the picking-mechanism frame without interfering with the movement of the latter, substantially as set forth.

22. In combination with the bearing $C^2$, the shaft $A^6$, journaled therein, the hub E, journaled thereon, the ratchet-wheel $e^4$, made fast to the shaft at the end of the bearing, the dog $e^3$, pivoted to the hub and having a tooth adapted to engage the ratchet, the sleeve $e^2$, journaled on the bearing and having slight range of rotary motion thereon and provided with the cams $e^{22}$ and $e^{23}$, the dog $e^3$ having the tooth $e^{30}$, adapted to ride on said cams and drop off their points, the spring controlling the action of the dog, the push-rod $L^6$, and the mechanism by which it is operated, having the finger in position to engage the sleeve $e^2$ and rock the same in the bearing, substantially as and for the purpose set forth.

23. In combination with the main frame, a frame pendent therefrom on a horizontal pivot located higher than the axis of the drive-wheel of the main frame, picking mechanism comprising ear-detaching devices journaled on said pendent frame remote from its pivot, the train which operates said ear-detaching devices, having its several shafts also journaled on said pendent frame, a rack C', fixed on the main frame and engaging a pinion in said train on the pendent frame, and the main driving-train on the main frame, engaging said pendent frame to rotate it about its pivotal support on the main frame, substantially as set forth.

24. In a corn-harvester, in combination with the main frame, the picking-frame E', pivoted thereon, the segment C', fixed on the main frame, having its center in the axis of the pivot of the picking-frame E', and the reel-arm having its shaft journaled on said picking-frame E' and provided with a lever-arm J', said segment being provided with a cam-track to engage and control the lever-arm J' as the picking-frame E' swings upon its pivotal support, whereby the swinging of the picking-frame E' causes the reel-arm to engage the stalks, substantially as set forth.

25. In a corn-harvester, in combination with the main frame, the picking-mechanism frame E', pivoted thereon, the segment C', rigid with the main frame, having its center in the axis of the pivotal support of the picking-mechanism frame, the picking mechanism mounted on said pivoted frame, comprising the pinion and a train deriving motion therefrom, said pinion meshing with the segment-rack C', the reel-arm having its shaft journaled on the picking-mechanism frame and provided with a lever-arm J', and the segment having a cam-track which engages and controls the position of said lever-arm, whereby the picking mechanism and the reel-arm are both actuated as the picking-mechanism frame swings on its pivot, substantially as set forth.

26. In combination, substantially as set forth, the segment-rack having the cam-track, the picking-mechanism frame having the axis of its pivot coincident with the axis of the segment-rack, the shaft H and the sleeve J, having coincident axes journaled one within the other, both supported on the picking-mechanism frame, the reel-arm attached to the sleeve, and the picking-mechanism train comprising the pinion H', fixed on the shaft H and meshing with the segment-rack, and the sleeve having the lever-arm J', controlled by the cam-track on said segment-rack, substantially as set forth.

27. In a corn-harvester, in combination with the gathering-mechanism frame adjustable vertically, the ear-receptacle located below the delivery-point of the gathering mechanism, and a chute which has its receiving end connected to and adapted to move vertically with the gathering-mechanism frame and located at the delivery-point of the gathering mechanism and which discharges into the receptacle, such chute being extensible to accommodate the vertical adjustment of the gathering mechanism, substantially as set forth.

28. In a corn-harvester, in combination with the main frame and the driving-train, picking-rolls operated by the main driving-train and revolved downward at their approximate surfaces, the frame on which said rolls are journaled being operated by the driving-train and carried upward during the picking action, the gearing-train by which said rolls are revolved and said frame moved upward being constructed to give to the rolls a peripheral motion more rapid than the upward motion of the frame in which they are journaled, substantially as set forth.

In testimony whereof I have hereunto set my hand, at Chicago, Illinois, in the presence of two witnesses, this 10th day of July, 1889.

GEORGE H. SPAULDING.

Witnesses:
 CHAS. S. BURTON,
 JEAN ELLIOTT.